US011801875B2

(12) United States Patent
Erharter et al.

(10) Patent No.: US 11,801,875 B2
(45) Date of Patent: Oct. 31, 2023

(54) HYBRID CABLE/RAIL TRANSPORTATION SYSTEM, TRANSPORTATION UNIT FOR SUCH A TRANSPORTATION SYSTEM AND METHOD FOR OPERATING SUCH A TRANSPORTATION SYSTEM

(71) Applicant: LEITNER S.P.A., Vipiteno (IT)

(72) Inventors: Nikolaus Erharter, San Candido (IT); Hartmut Wieser, Racines (IT); Giuseppe Conte, Bolzano (IT)

(73) Assignee: LEITNER S.P.A., Vipiteno (IT)

( * ) Notice: Subject to any disclaimer, the term of this patent is extended or adjusted under 35 U.S.C. 154(b) by 530 days.

(21) Appl. No.: 17/044,168

(22) PCT Filed: Apr. 10, 2019

(86) PCT No.: PCT/IB2019/052959
§ 371 (c)(1),
(2) Date: Sep. 30, 2020

(87) PCT Pub. No.: WO2019/198008
PCT Pub. Date: Oct. 17, 2019

(65) Prior Publication Data
US 2021/0031811 A1 Feb. 4, 2021

(30) Foreign Application Priority Data
Apr. 10, 2018 (IT) .................. 102018000004362

(51) Int. Cl.
*B61B 15/00* (2006.01)
*B61B 12/00* (2006.01)
*B61F 1/14* (2006.01)

(52) U.S. Cl.
CPC ............ *B61B 15/00* (2013.01); *B61B 12/002* (2013.01); *B61F 1/14* (2013.01)

(58) Field of Classification Search
CPC .... B61B 1/00; B61B 1/02; B61B 3/00; B61B 7/00; B61B 7/04; B61B 12/002;
(Continued)

(56) References Cited

U.S. PATENT DOCUMENTS

| 6,862,998 B2 * | 3/2005 | Doppelmayr ........... B61B 12/04 105/156 |
| 7,490,556 B2 * | 2/2009 | Rein ..................... B61B 12/028 104/87 |
| 9,688,289 B2 * | 6/2017 | Luger ....................... B61B 7/02 |
| 11,492,021 B2 * | 11/2022 | Erharter ................ B61B 12/028 |

FOREIGN PATENT DOCUMENTS

| FR | 3 001 432 A1 | 8/2014 | |
| FR | 3001432 A1 * | 8/2014 | ............. B61B 15/00 |

(Continued)

OTHER PUBLICATIONS

Notification Concerning Submission, Obtention or Transmittal of Priority Document for International Application No. PCT/IB2019/052959 dated Jun. 26, 2019.

(Continued)

*Primary Examiner* — S. Joseph Morano
*Assistant Examiner* — Cheng Lin
(74) *Attorney, Agent, or Firm* — Neal, Gerber & Eisenberg LLP

(57) ABSTRACT

A hybrid cable/rail transportation system comprising: at least one system portion configured as a cable transportation system comprising at least one cable; at least one system portion configured as a rail transportation system comprising at least one rail, wherein the system portion configured as a cable transportation system is upstream and/or downstream of the system portion configured as a rail transportation system; a plurality of transportation units, wherein each transportation unit comprises a cabin; wherein each cabin is configured for being moved along the entire system, respec- (Continued)

tively supported hanging from the cable along the system portion configured as a cable transportation system and supported resting on the rail along the system portion configured as a rail transportation system.

8 Claims, 5 Drawing Sheets

(58) Field of Classification Search
CPC ..... B61B 12/02; B61B 12/022; B61B 12/024; B61B 12/028; B61B 15/00; B61D 15/00; B61D 15/125; B61F 1/14
See application file for complete search history.

(56) References Cited

FOREIGN PATENT DOCUMENTS

| | | |
|---|---|---|
| JP | H09 240466 A | 9/1997 |
| KR | 101 497 481 B1 | 3/2015 |
| WO | WO 2015/077806 A1 | 6/2015 |

OTHER PUBLICATIONS

International Search Report and Written Opinion for International Application No. PCT/IB2019/052959 dated Aug. 23, 2019.
PCT Demand for International Preliminary Examination and Reply to International Search Report and the associated Written Opinion for International Application No. PCT/IB2019/052959 dated Feb. 7, 2020.
Notification of Receipt of Demand by Competent International Preliminary Examining Authority (Form PCT/IPEA/402) for International Application No. PCT/IB2019/052959 dated Feb. 14, 2020.
Second Written Opinion of the International Preliminary Examining Authority for International Application No. PCT/IB2019/052959 dated Mar. 13, 2020.
Reply to the Second Written Opinion of the International Searching Authority for International Application No. PCT/IB2019/052959 dated Apr. 20, 2020.
Notification of Transmittal of the International Preliminary Report on Patentability (Form PCT/IPEA/416) for International Application No. International Application No. PCT/IB2019/052959 dated Jun. 30, 2020.

* cited by examiner

HYBRID CABLE/RAIL TRANSPORTATION SYSTEM, TRANSPORTATION UNIT FOR SUCH A TRANSPORTATION SYSTEM AND METHOD FOR OPERATING SUCH A TRANSPORTATION SYSTEM

PRIORITY CLAIM

This application is a national stage application of PCT/IB2019/052959, filed on Apr. 10, 2019, which claims the benefit of and priority to Italian Patent Application No. 102018000004362, filed on Apr. 10, 2018, the entire contents of which are each incorporated by reference herein.

TECHNICAL FIELD

The present disclosure relates to a transportation system. In particular, the present disclosure relates to a hybrid cable/rail transportation system wherein the transportation units travel along the path where we find in succession, without transport interruption, a cable system portion and a rail system portion. The expression "without transport interruption" means that passengers do not have to get off the transportation unit at the end of the cable system section and onto another transportation unit in order to travel on the rail system section. However, without transport interruption does not mean that the transportation units may not be stopped at stations located along the path.

In addition, the present disclosure relates to a transportation unit configured to be used in such a hybrid cable/rail transportation system and to the method for operating the hybrid cable/rail transportation system.

BACKGROUND

The transportation systems wherein people or things are transported along a path inside transportation units fed in succession can be divided in two different types which are alternatively used depending on various environmental conditions. A first type of system corresponds to cable transportation systems wherein the transportation units are supported hanging from at least one supporting cable. The second type of system corresponds to rail transportation systems wherein the transportation units are supported by rails. This latter type can then further be divided into two subgroups depending on whether the rails are in any case supported hanging (i.e., without any lower support) or inferiorly rest on the rail. For the purposes of the present disclosure, by rail transportation system one refers to this latter category wherein the cabins rest on the rails and are not suspended in the air.

The choice of one type of system or the other mainly depends on the morphology of the path to be covered, which can indeed have only planimetric or only altimetric profiles or a combination of both, with rectilinear sections but with steep gradients or with curvilinear sections but substantially flat.

The functional choice for the use of a cable system or a rail system can be summarised as follows:
  if the planimetric path comprises curvilinear and rectilinear sections but without significant gradients (typical urban setting), it is preferable to use a rail transportation system;
  if the planimetric path comprises steep gradients and significantly different altitudes (but mainly with rectilinear sections), it is preferable to use a cable transportation system.

Currently, in the event of hybrid paths (i.e., with sections which would be suitable for cable transportation followed by sections which, on the other hand, would be suitable for rail transportation), it is known to arrange two different systems in succession wherein, also sharing an intermediate interchange station, users are requested to change transportation unit so as to transfer from one system to the other. Even if the systems are adjacent it may, in any case, be relatively inconvenient for passengers due to the transfer from one system to the other.

PCT Patent Application No. WO2015/077806 describes a transportation system in which the transportation units travel without transport interruption along the path presenting, in succession, cable system portions and rail system portions. According to PCT Patent Application No. WO2015/077806 the transportation units, for the cabin type, comprise externally to the roof a frame coupled with a trolley supported by the supporting cables. The interchange from a cable system portion to a rail system portion occurs at the station where usually the transportation units are already uncoupled from the cables and move supported hanging from specific upper tracks. Before exiting the station, the trolley of the transportation units couples with a second motor-driven or motorised trolley rested on such upper rails. Hence, in such a configuration the transportation units are supported by the rail but are in any case suspended in the air with their trolley attached to the motorised trolley. Due to the driving means of the motor-driven trolley, the transportation units move along the tracks and travel (always lifted) along a rail path section. Thus, according to PCT Patent Application No. WO2015/077806 the transportation units used on the cable system section are fully (hence with the related trolley) used in the rail transportation section where the use of the motor-driven trolleys travelling on the rails is also foreseen.

Such a solution, albeit eliminating the transfer between the different systems, has some drawbacks, with particular reference to the path portion with rail transportation. Indeed, also in such a path, normally characterised by considerable bends in the flat part, the transportation units are lifted in the air and can therefore oscillate in a longitudinal and transversal direction as in the cable section. Moreover, the presence of two mutually coupled trolleys leads to much higher volumes compared to what is required in a classic rail transportation system.

SUMMARY

Starting from this prior art, it is a purpose of the present disclosure to implement a hybrid cable/rail transportation system suitable for overcoming certain of the drawbacks highlighted in certain of the known art.

In accordance with such purpose, the present disclosure relates to a hybrid cable/rail transportation system comprising a plurality of transportation units; wherein each transportation unit comprises a cabin. The system of the present disclosure is described as hybrid because the system comprises at least one system portion configured as cable transportation system with at least a supporting or carrying cable and at least a system portion configured as rail transportation system with at least a rail. The passage from one system portion to the other occurs at an intermediate station wherein the supporting cable ends and wherefrom the rail begins. It should be appreciated that the present disclosure also provides for the opposite possibility wherein the rail system portion is upstream of the intermediate station and the cable system portion is downstream thereof. In certain embodiments, inside the station the supporting cable is replaced by an upper track or rail which has the function of supporting the cabin in a hanging configuration for at least one section at the station.

The movement of the cabins in the cable or rail system sections can be controlled in various ways, for example it is possible to provide for a hauling cable or specific driving means directly integrated in the transportation units (for example motorised trolleys) or through linear actuators.

According to certain aspects of the present disclosure, each cabin is configured for being moved along the entire system. Indeed, each cabin is configured for being selectively supported hanging from the supporting cable along the system portion configured as cable transportation system and supported resting on the rail along the system portion configured as rail transportation system.

Advantageously, according to such aspects of the disclosure, passengers are not required to change cabin when passing from a system portion to another and, furthermore, when travelling along the rail system portion the vehicle oscillations are virtually non-existent since the cabin rests on a rigid track. Additionally, one may include specific hanging systems so as to increase relative comfort during the travel. Along the rail section of the system, the track may develop into any of the possible types, namely flush with the ground, in a tunnel and in an elevated configuration.

In certain embodiments, the system portion configured as cable transportation system comprises a first trolley supported hanging from the supporting cable. Complementarily, the system portion configured as rail transportation system comprises a second trolley supported resting on the rail. Each cabin comprises a roof, provided with a first coupling device configured for selectively coupling with the first trolley, and a floor provided with a second coupling device configured for selectively coupling with a second trolley. Thus, according to this aspect of the disclosure when travelling along the rail system portion the cabin does not proceed also transporting the trolley used in the previous portion of the cable system and vice versa.

Advantageously, according to this aspect of the disclosure the overall vertical volume of the transportation unit when the transportation unit travels along the rail section is significantly smaller compared with that of the transportation unit when the transportation unit travels along the cable section. Indeed, along the rail portion the transportation unit is not coupled with the cable trolley, nor with its suspension arm which is inferiorly connected to the roof of the cabin. In the rail section the second trolley does not comprise any suspension arm but only a supporting frame. Also transversely the inertia of the transportation unit travelling on the rail is much lower than the inertia of the transportation unit travelling along the cable section. Advantageously such lower inertia is matched by a lesser possible oscillation and hence relatively greater travel comfort. A further advantage of such an aspect of the present system consists in the use of the smallest possible number of upper cables supporting trolleys, in particular it is equal to the number of vehicles which circulate only in the cable portion of the system. Indeed, in the rail section the transportation units are only provided with a lower trolley but not with an upper trolley. Thus, the number of upper trolleys circulating in the system is minimised, to the benefit of investment costs and of the required maintenance for such components.

Hence, the present disclosure also comprises an innovative method for operating a hybrid cable/rail transportation system as previously described. Such a method comprises the steps of:

a) moving the cabin along the system portion configured as supported hanging from the first trolley which is itself supported hanging from the supporting cable of the cable transportation system portion;

b) uncoupling the cabin from the first trolley;

c) coupling the cabin supported resting on the second trolley which is itself supported resting on the rail of the rail transportation system portion;

d) moving the cabin along the system portion configured as a rail transportation system supported resting on the second trolley which is itself supported resting on the rail.

The above-mentioned steps relate to the passage from a cable to a rail system portion. Additionally, the method of the present disclosure also involves the opposite, namely the passage from a rail to a cable system portion. In the latter case the method comprises the steps of:

e) moving the cabin along the system portion configured as a rail transportation system supported resting on the second trolley which is itself supported resting on the rail of the rail transportation system portion;

f) uncoupling the cabin from the second trolley;

g) coupling the cabin supported hanging from the first trolley which is itself supported hanging from the supporting cable of the cable transportation system portion;

h) moving the cabin along the system portion configured as a cable transportation system supported hanging from the first trolley which is itself supported hanging from the supporting cable.

In certain embodiments, the method of the present disclosure comprises at least one time interval during the passage from one system portion to the other, wherein the cabin is coupled with both the first trolley and the second trolley.

Advantageously, according to this aspect of the disclosure, situations in which the cabin is neither connected to the first nor to the second trolley are avoided.

The coupling and the uncoupling of the trolleys may occur when the cabin is still or traveling and suitable actuating cams may be used. In certain embodiments, such coupling/uncoupling is carried out along a rectilinear advance section.

Finally, the present disclosure also refers to the cabin configured to be moved along the entire system, respectively supported hanging from the supporting cable by the first trolley along the system portion configured as a cable transportation system and supported resting on the rail by the second trolley along the system portion configured as a rail transportation system.

BRIEF DESCRIPTION OF THE DRAWINGS

Further features and advantages of the present disclosure will be apparent from the following description of a non-limiting embodiment thereof, with reference to the figures of the accompanying drawings, wherein.

DETAILED DESCRIPTION

The present disclosure relates to a hybrid cable/rail transportation system, a relative operating method of such a system and a cabin of such a system configured to travel along the entire system.

Figure 1:
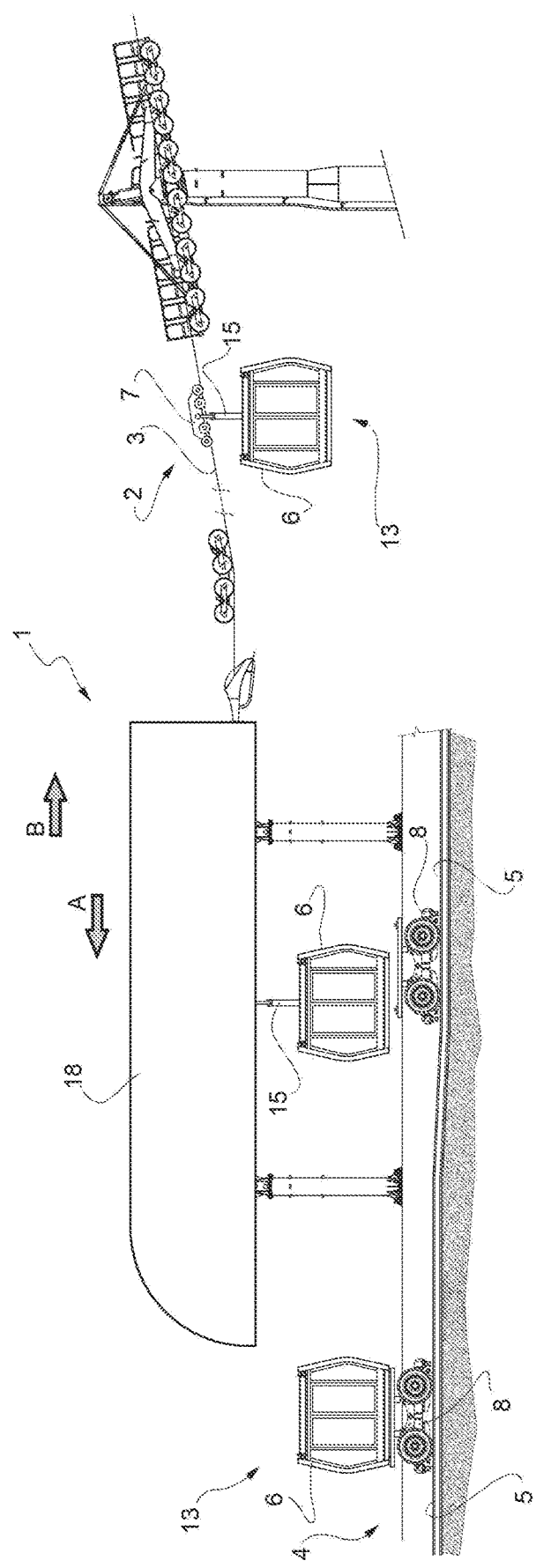
FIG. 1 is a schematic view of a portion of a hybrid cable/rail transportation system according to the present disclosure.

In particular, FIG. 1 is a schematic view of a portion of a hybrid cable/rail transportation system (schematized with reference numeral 1) according to the present disclosure. Such a figure shows a system portion configured as a cable transportation system, identified with reference numeral 2, and a system portion configured as a rail transportation system, identified with reference numeral 4. Said two different system configurations are joined to each other at an intermediate station 18 wherein the cabin 6 enters supported in a certain way and exits supported in another way. The arrows A and B designate how, according to the present disclosure, the travel direction of the system may be interchangeably oriented so as to pass from a cable support to a rail support or vice versa. It should be appreciated that the system may be of a "to and fro" type with only one ascent and descent branch or it may have parallel ascent and descent branches. For the purposes of the present disclosure, the operating motion both along the cable section and the rail section may be of any type, namely it can provide for a hauling cable or suitable driving means integrated in the trolleys present in the sections of the system. As schematized in FIG. 1, the system portion configured as a cable transportation system 2 comprises a supporting cable 3 which also acts as a hauling cable in such a system portion. Nevertheless, alternative solutions may be envisioned with one or more supporting cables and a different hauling cable. Along the cable system portion the transportation unit 13 comprises a cabin 6, a first trolley 7 and a support arm connecting the trolley 7 to the cabin. The trolley 7 is configured to be supported hanging from the supporting cable 3. In turn, the cabin 6 is supported hanging from the trolley 7 by the suspension arm 15. In the system portion configured as a rail transportation system 4 the transportation unit 13 comprises a cabin 6 supported resting on a second trolley 8 which is itself supported resting on a rail 5. As will emerge from the description of the following figures, the cabin 6 of the rail section 5 is precisely a cabin 6, previously moving along the cable system section, which has uncoupled from the related first trolley 7 and suspension arm 15 and has coupled with the second trolley 8.

Figure 2:
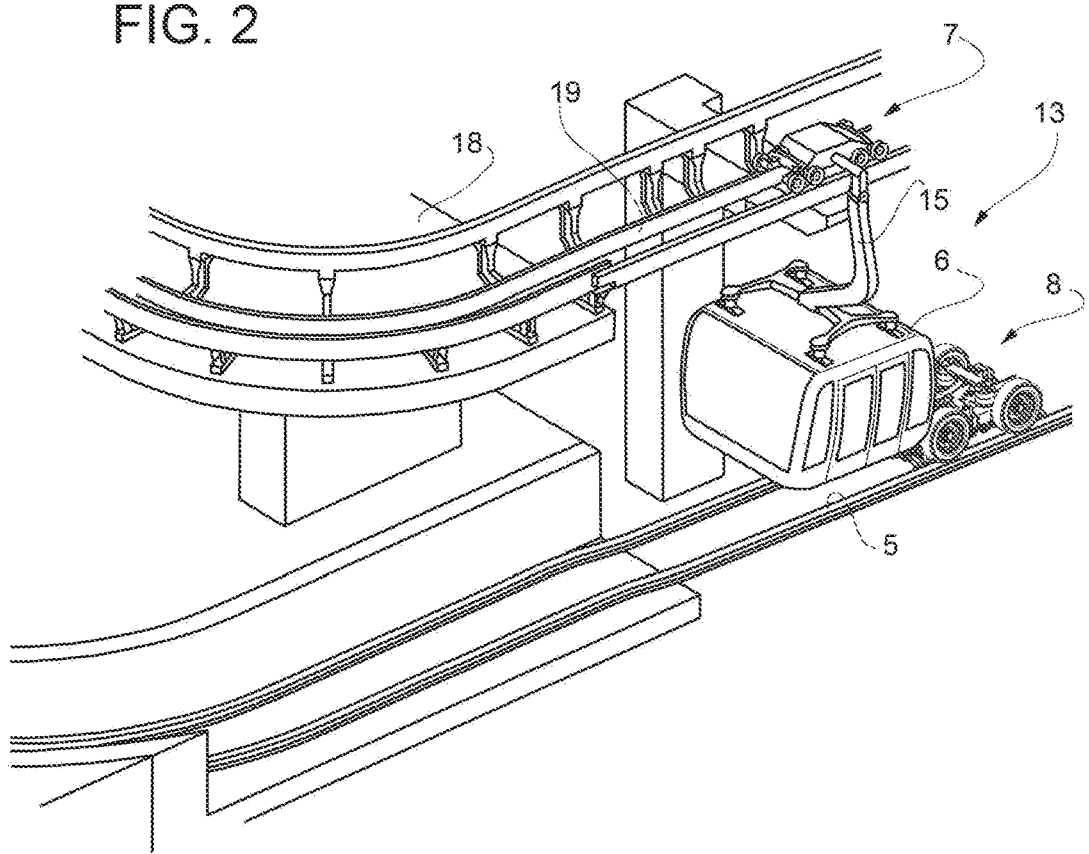
FIGS. 2, 3, and 4 are schematic views of subsequent operating steps of the system in FIG. 1.
Figure 3:
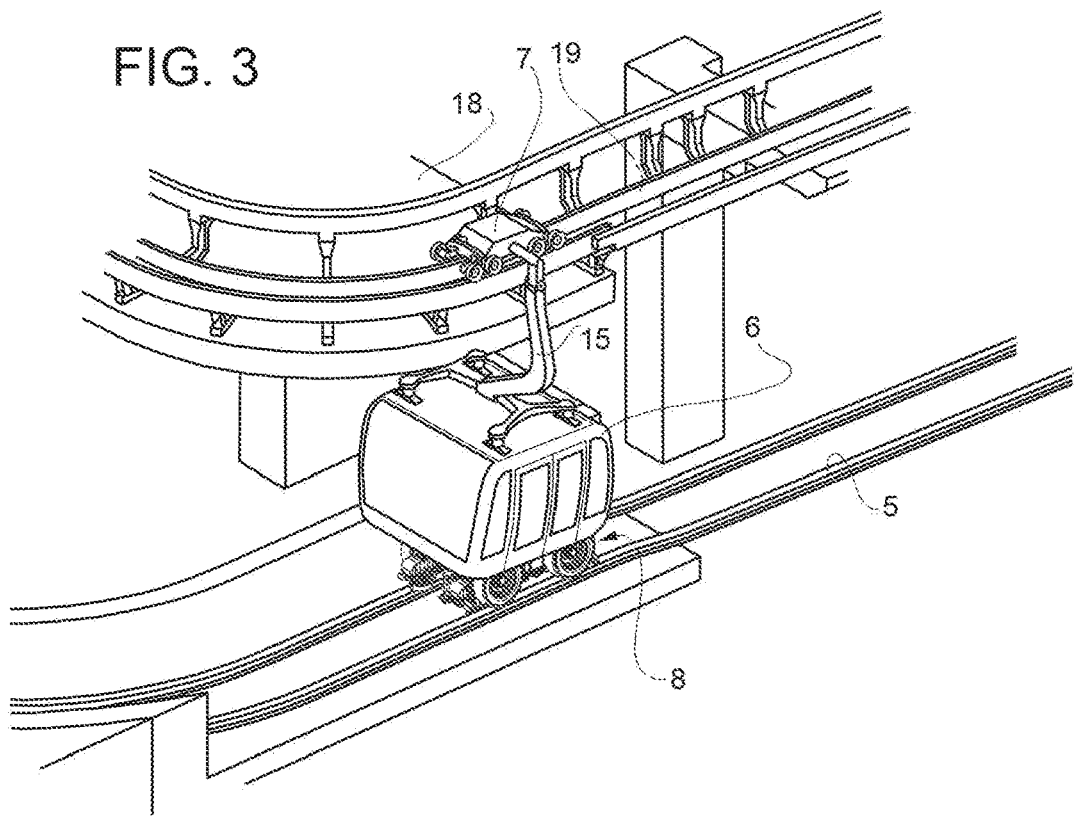
Figure 4:
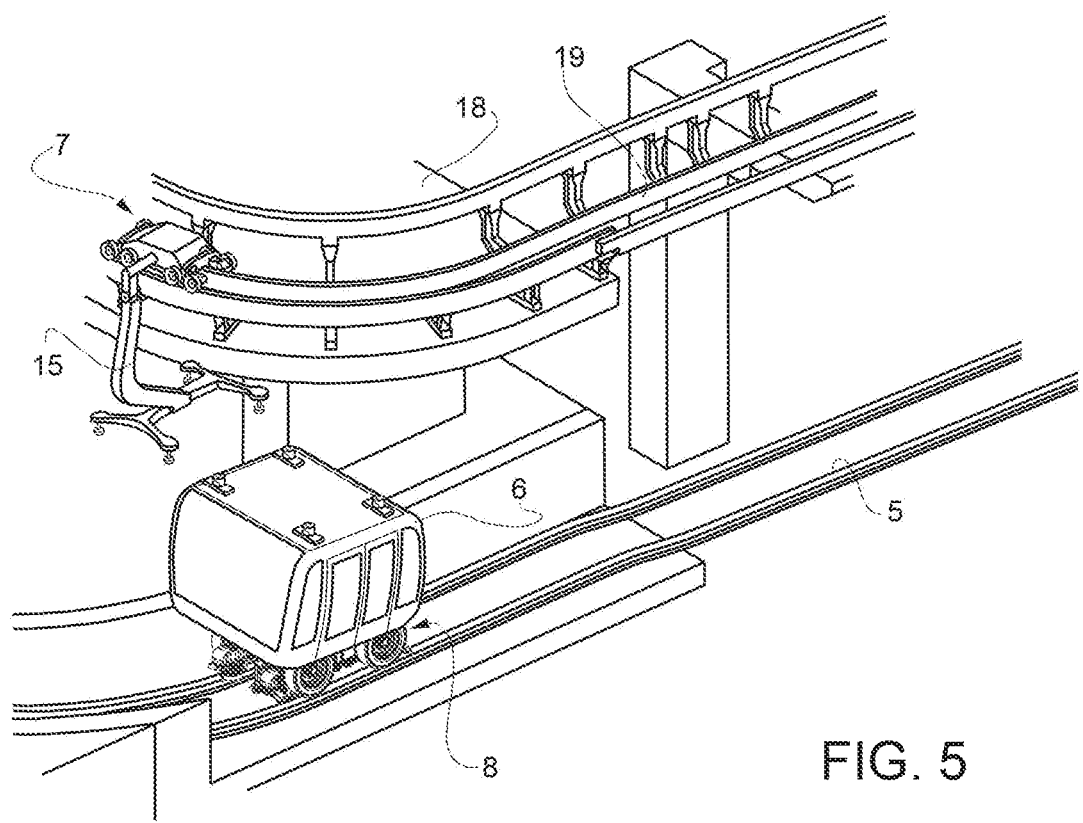

FIGS. 2 to 4 are schematic views of the subsequent operating steps of the system in FIG. 1, showing in particular the operation of the system inside the station 18 wherein the cabin uncouples from the related first trolley 7 and suspension arm 15 and couples with the second trolley 8. FIG. 2 shows a transportation unit 13 which enters the station 18 after having travelled along a portion of the cable system 2. Inside the station the function of supporting the cabins in a hanging configuration is ideally transferred from the supporting cable 3 to an upper track 19 supporting the first trolley 7. Inside the station 18, the cabin is moved, hanging from the upper track 19, along a path wherein below the cabin 6 lies the first section of the rail 5, which will then proceed outside the station 18 along the rail transportation system portion 4. As seen, there is a second trolley 8 inside the station, supported resting on the rail 5 and ready to receive the cabin 6. FIG. 3 shows a subsequent step in which the second trolley 8 is moved so as to reach the cabin 6 and proceed with the latter in synchronous motion. In such a configuration the cabin 6, before uncoupling itself from the first trolley 7, couples with the second trolley 8 and then proceeds for a short distance, such as rectilinear, with a double coupling respectively lower and upper. Once the coupling with the second trolley 8 is ensured, the cabin 6 uncouples itself from the first trolley 7 which proceeds in plan view along a different path from that of the cabin 6 rested on the second trolley. FIG. 4 schematically shows the configuration in which the cabin 6 is no longer supported hanging from the first trolley 7 and proceeds supported resting on the second trolley 8. In certain embodiments, the first trolley 7 is sent back to the station 18 and, before leaving such station, the first trolley is coupled with another cabin which travels along the system in the opposite direction and which has just travelled along a previous rail system portion 4.

Figure 5:
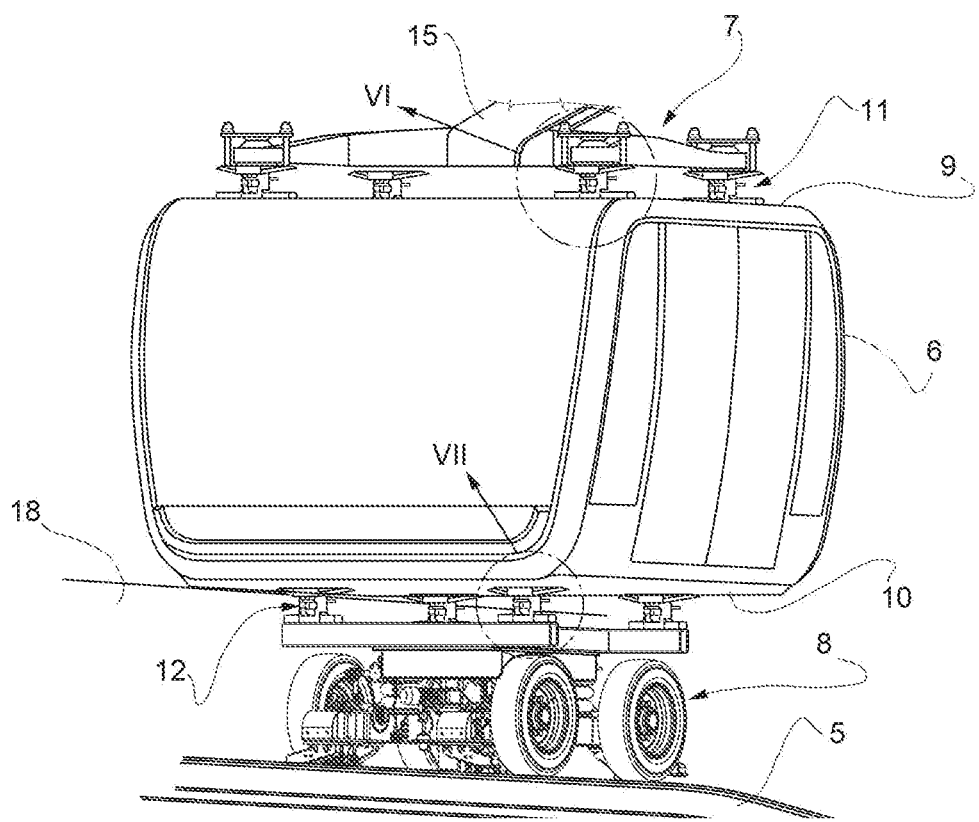
FIG. 5 is an enlarged schematic view of the cabin in the configuration of FIG. 3.

FIG. 5 shows an enlarged schematic view of the cabin in the configuration of FIG. 3, wherein the cabin is coupled both with the first trolley 7 and with the second trolley 8. In such a configuration the first trolley 7 is only partly visible, in particular the lower portion of the suspension arm 15 coupled with the roof 9 of the cabin 6. On the opposite side, the external face of the floor 10 of the cabin rests and is firmly coupled with the second trolley 8 which travels on the rail 5. According to such an example, both the coupling with the first trolley 7 and that with the second trolley 8 comprise respectively four male-female coupling points between suitable pins and seats.

Figure 6:
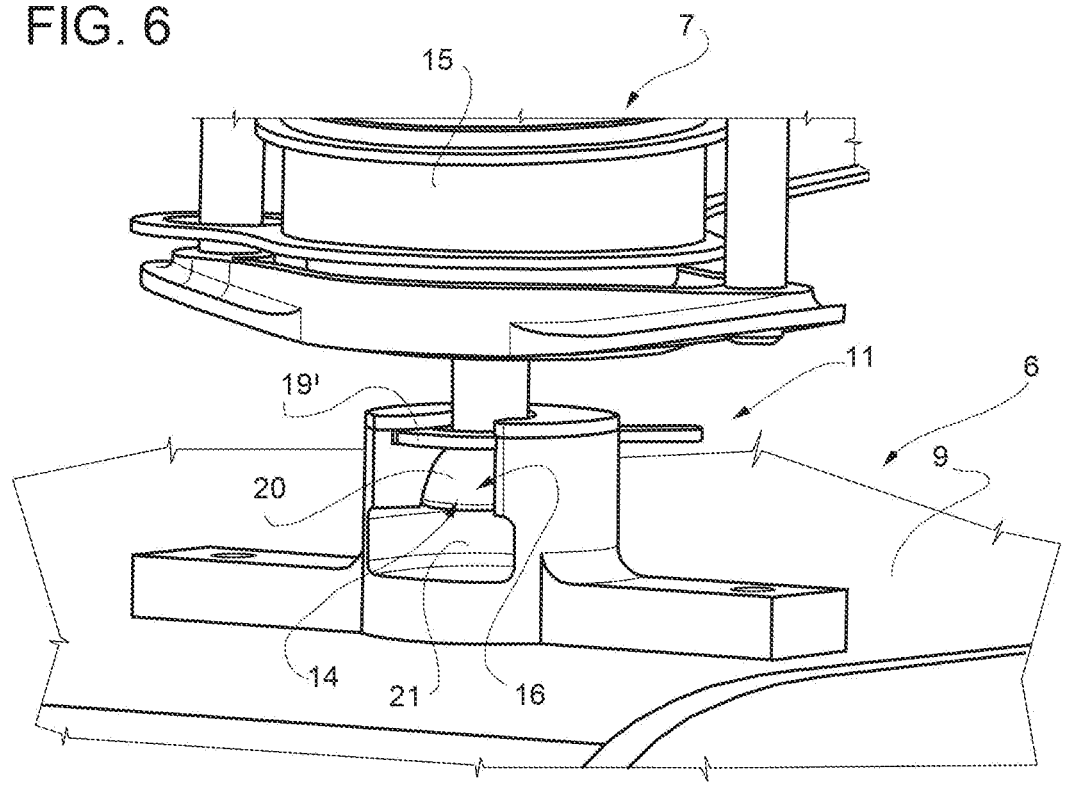
FIGS. 6 and 7 are enlarged schematic views of the details shown in FIG. 5 designated respectively by reference numerals VI and VII.
Figure 7:
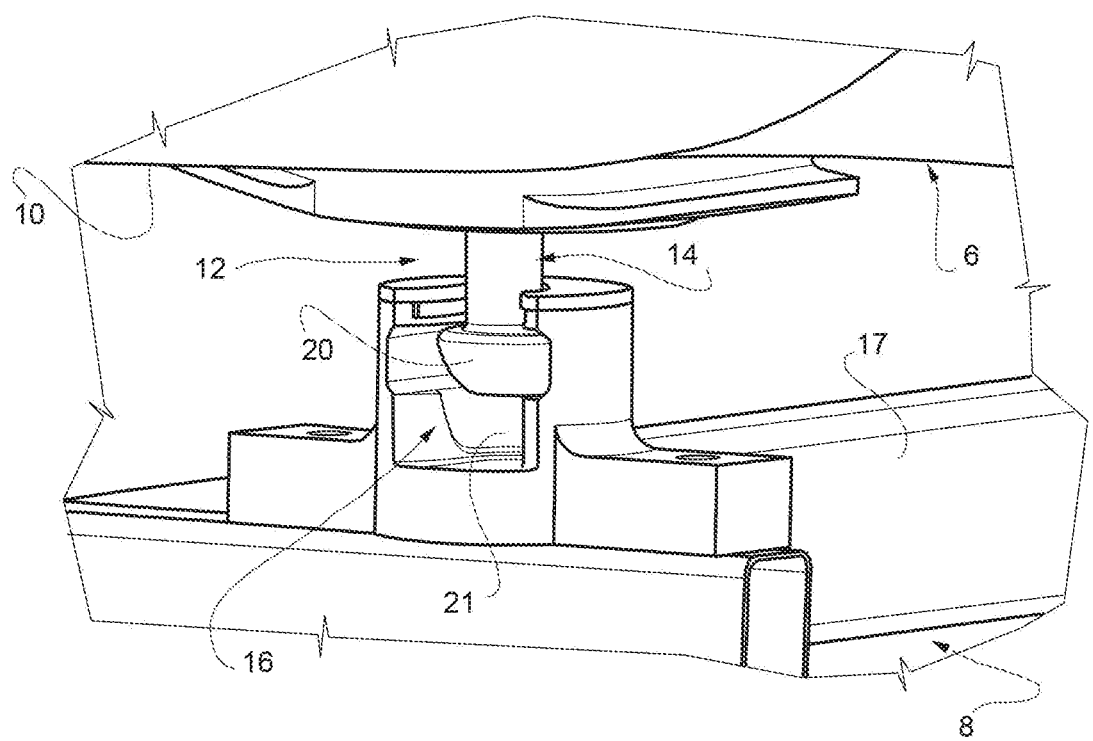

FIGS. 6 and 7 are enlarged schematic views of the details shown in FIG. 5, designated respectively by reference numerals VI and VII, that illustrate an exemplary embodiment of the releasable coupling between the cabin 6 and the trolleys 7 and 8. According to FIG. 6, a plurality of pins 14 with a countersunk head project from the lower portion of the suspension arm 15 of the trolley 7. Complementarily, the roof 9 of the cabin 6 comprises a seat which is frontally open and shaped with a larger longitudinally protruding portion 21 of the pin 14 head and an upper portion with a smaller cross-section wherein under gravity the countersunk head 20 of the pin 14 is trapped and prevents the fall of the cabin 6 in the cable system section. Moreover, a safety device in the form of a safety lever 19' is foreseen. In order to uncouple the cabin 6 from the first trolley, it is necessary to release the safety lever 19', relatively lower the pin 14 inside the seat so as to reach the larger cross-section protruding portion 21 and relatively slide the trolley 7 with respect to the cabin 6. Absolutely complementarily, the coupling between the floor 10 of cabin 6 and the second trolley 8 also includes a similar coupling with pins 14 and seats 21. As shown in FIG. 7, the pins 14 with a countersunk head 20 project from the floor 10 of the cabin and couple with the related seats 16 arranged on the upper face of a frame 17 of the second trolley 8. Given that the coupling form and the uncoupling modes are exactly the same as those relating to the first trolley 7, in this figure the same reference numerals used in FIG. 7 have been used.

Figure 8:
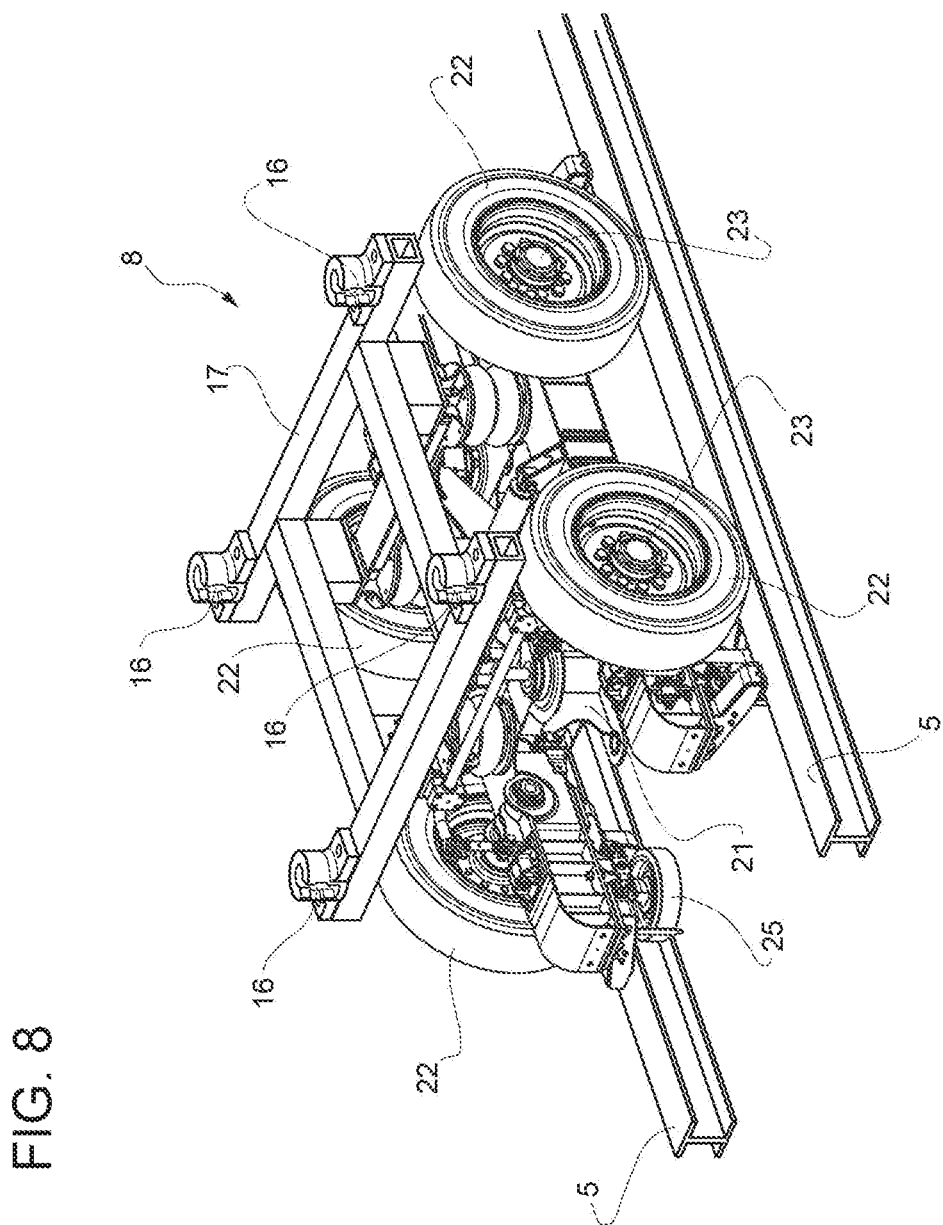
FIG. 8 shows a schematic perspective view of the trolley which supports the cabin along the rail system portion.

Finally, FIG. 8 shows a schematic perspective view only of the second trolley 8 supporting the cabins 6. This trolley 8 is supported resting on the rail 5 and can be of the electric self-propelled type, or inductive (with a linear motor), or cable-hauled type. In this example the second trolley 8 travels on a track 5 essentially defined by two IPE-shaped rails, or the like, arranged side by side and connected to a central supporting metal section which is itself connected to supports with a variable pitch depending on the path. According to FIG. 8, the trolley is of the self-propelled electrically operated type, it is defined by a central frame 21 connected to four supporting wheels 22 provided with tyres, each containing an electric motor 23 coaxial to the hub which enables the handling of the trolley 8. In addition to the supporting wheels 22, the second trolley 8 is equipped with side wheels 24 acting as a guide with respect to the tracks 5 and enabling them to move also in the bends. Other mechanical support and rollover stability control systems ensure the safety even in case of wheel malfunction. It should be appreciated that other embodiments of self-propelled trolleys are possible, as long as they are provided with a connection to the cabin which is the subject-matter of the present disclosure.

Lastly, it is clear that modifications and variations may be made to the disclosure described herein without departing from the scope of the appended claims. That is, the present disclosure also covers embodiments that are not described in the detailed description above as well as equivalent embodiments that are part of the scope of protection set forth in the appended claims. Accordingly, various changes and modifications to the presently disclosed embodiments will be apparent to those skilled in the art.

The invention claimed is:

1. A hybrid cable/rail transportation system comprising:
   a cable transportation system portion comprising a cable and a first trolley configured to be supported by hanging from the cable;
   a rail transportation system portion comprising a rail and a second trolley configured to be supported by resting on the rail, wherein the cable transportation system portion is at least one of: upstream of the rail transportation system portion and downstream of the rail transportation system portion; and
   a transportation unit comprising a cabin comprising a roof with a first coupling device configured to be selectively coupled with the first trolley, and a floor with a second coupling device configured to be selectively coupled with the second trolley, the cabin configured to be:
      (i) supported by hanging from the cable and moved along the cable transportation system portion, and
      (ii) supported by resting on the rail and moved along the rail transportation system portion.

2. The hybrid cable/rail transportation system of claim 1, wherein:
   the first trolley comprises a suspension arm having a free end configured to be coupled with the first coupling device,
   the suspension arm comprises a plurality of pins, and
   the first coupling device comprises a plurality of seats projecting from the roof of the cabin and configured to be selectively coupled with the plurality of pins.

3. The hybrid cable/rail transportation system of claim 1, wherein:
   the second trolley comprises a supporting frame for the cabin, and
   the second coupling device comprises a plurality of pins projecting from the floor of the cabin and configured to be selectively coupled with a plurality of seats projecting from the frame of the second trolley.

4. A hybrid cable/rail transportation system cabin comprising:
   a roof with a first coupling device configured to be selectively coupled with a first trolley of a cable transportation system portion comprising a cable, wherein when coupled with the first trolley, the hybrid cable/rail transportation system cabin is configured to be supported by hanging from the cable and moved along the cable transportation system portion; and
   a floor with a second coupling device configured to be selectively coupled with a second trolley of a rail transportation system portion comprising a rail, wherein the rail transportation system portion is at least one of upstream of the cable transportation system portion and downstream of the cable transportation system portion and when coupled with the second trolley, the hybrid cable/rail transportation system cabin is configured to be supported by resting on the rail and moved along the rail transportation system portion.

5. The hybrid cable/rail transportation system cabin of claim 4, wherein the first coupling device comprises a plurality of seats projecting from the roof, the plurality of seats configured to be selectively coupled with a plurality of pins of the first trolley.

6. The hybrid cable/rail transportation system cabin of claim 4, wherein the second coupling device comprises a plurality of pins projecting from the floor, the plurality of pins configured to be selectively coupled with a plurality of seats of the second trolley.

7. A method for operating a hybrid cable/rail transportation system, the method comprising:
   (a) moving a cabin along a cable transportation system portion supported by hanging from a first trolley, the cabin comprising a roof with a first coupling device configured to be selectively coupled with the first trolley, and a floor with a second coupling device configured to be selectively coupled with a second trolley;
   (b) uncoupling the cabin from the first trolley;
   (c) coupling the cabin with the second trolley;
   (d) moving the cabin along a rail transportation system portion supported by resting on the second trolley; and
   (e) at least one of:
      (i) moving the cabin further along the rail transportation system portion supported by resting on the second trolley;
      (ii) uncoupling the cabin from the second trolley;
      (iii) coupling the cabin with the first trolley; and
      (iv) moving the cabin along the cable transportation system portion supported by hanging from the first trolley.

8. The method of claim 7, wherein (c) occurs before (b) such that the cabin is temporarily coupled with both the first trolley and the second trolley.

* * * * *